C. L. Lee.
Corn Planter.
N°79,236. Patented Jun. 23, 1868.

Witnesses:
J. H. Burridge
K. Coon

Inventor:
C. L. Lee

United States Patent Office.

CHARLES L. LEE, OF FITCHVILLE, OHIO.

Letters Patent No. 79,236, dated June 23, 1868.

---

IMPROVEMENT IN COMBINED CULTIVATOR AND PLANTER.

---

*The Schedule referred to in these Letters Patent and making part of the same.*

---

TO ALL WHOM IT MAY CONCERN:

Be it known that I, CHARLES L. LEE, of Fitchville, in the county of Huron, and State of Ohio, have invented certain new and useful Improvements in Cultivators and Planters; and I do hereby declare that the following is a full and complete description of the same, reference being had to the accompanying drawings, making a part of this specification, in which—

Figure 1:
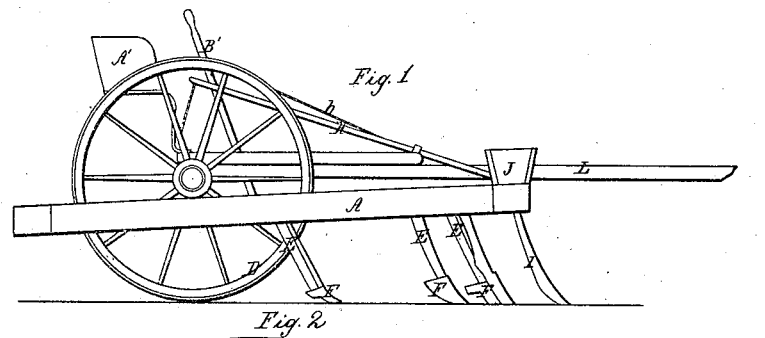

Figure 1 is a side view of the machine.

Figure 2:
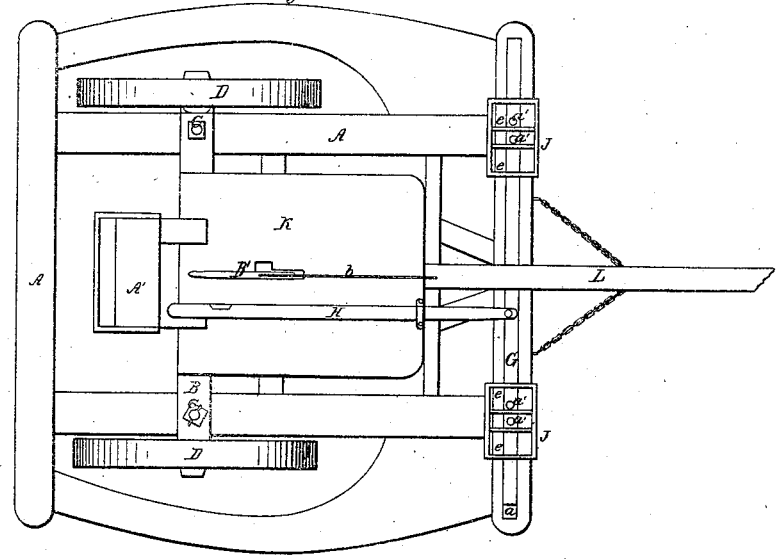

Figure 2, a view of the top.

Figure 3:
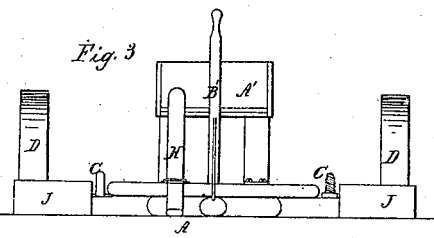

Figure 3, a front view.

Like letters of reference refer to like parts in the several views.

In fig. 1, A represents the frame of the machine, and which is suspended from the axle-tree B by means of the adjusting screw-bolts C, fig. 8, whereby it can be raised and lowered, as and for a purpose hereinafter shown. D are the wheels on which the machine is carried.

Proceeding from the under side of the frame are standards E, to which are fixed the shares or blades F, of the shape and arranged in the order as shown in fig. 3. Longitudinally through the centre of the front rail of the frame is cut a groove, a, fig. 2, in which is fitted a slide, G, pivoted to and operated by the lever H.

Near to each end of the slide are seed holes, a'. A hole corresponding in size to these, is made through the bottom of the groove, in which the slide moves. Said holes are in such relation to the teeth I as to be immediately behind them, and partially enclosed thereby, the upper end of the teeth being rounded, forming a kind of tube in connection with said hole.

J are the seed-boxes, in which the corn or grain is placed, and which, as will be seen, are immediately over the seed-holes a'; also, that they are divided into three compartments, the outside ones being for the reception of the grain.

K, fig. 2, is a platform, the hind end of which is connected to the axle-tree. L is the pole, to which the team is geared for drawing the machine.

The practical operation of this machine, as a cultivator, is as follows: The tubular teeth I may be removed or not. The operator then takes his place in the seat A', and thus drives over the field. The shares, entering the ground, stir it up, and reduce it to a free, mellow, and proper condition for planting. The depth that the shares enter the ground is regulated by the operator, who, by means of the lever B', connected to the cultivator by the chain or cord b, can thereby elevate the cultivator from the ground more or less, as the condition of the soil may require. The draught of the machine being from the axle-tree direct, and not from the frame, and as the frame is suspended from the axle-tree by the adjusting-screws C, it can be graduated to run at any desirable depth, or lifted entirely from the ground, for the purpose of moving the machine from place to place.

In order to use the machine as a planter only, the shares are taken off, and the teeth I inserted in the seed-holes. The grain is then placed in the end-compartments of the boxes. This being done, the operator, as before, takes his place on the seat, and starts off in the line of work. As the machine moves forward, the teeth plow a furrow, into which, at equal and proper distances, the grain is dropped by the operator, who, by pushing the lever H in either direction, brings the holes a' in open relation to the hole in the bottom of the groove, through which the grain falls to the ground.

The holding-capacity of the holes in the slide is equal to from four to six grains, which, when in the hole, are carried, on moving the slide, into the middle compartment of the box, into which the hole in the bottom of the groove opens.

The lower edge of the partitions of the box is made to fit close down upon the slide, hence no more grain than is carried by the slide can fall from the box to the ground, so that every hill will contain an equal number of grains.

This machine is simple in its construction, and easily operated, requiring but little skill and labor in its management.

Instead of a screw and nut for adjusting the depth of the cultivator, a standard may be used, through which a pin may be inserted, in place of a nut, as shown at c, fig. 3.

What I claim as my improvement, and desire to obtain by Letters Patent, is—

1. The adjustable frame A, platform K, lever B', axle-tree B, and wheels D, all constructed and arranged to operate in the manner substantially as set forth.

2. The slide-boxes J, groove a, slide G, and lever H, as constructed and arranged to operate, in the manner and for the purpose specified

CHARLES L. LEE.

Witnesses:
W. H. BURRIDGE,
THOS. BRETT.